June 10, 1941.    S. C. EWING    2,245,189
CONTROL SYSTEM FOR ALTERNATING CURRENT MOTORS
Filed July 18, 1939
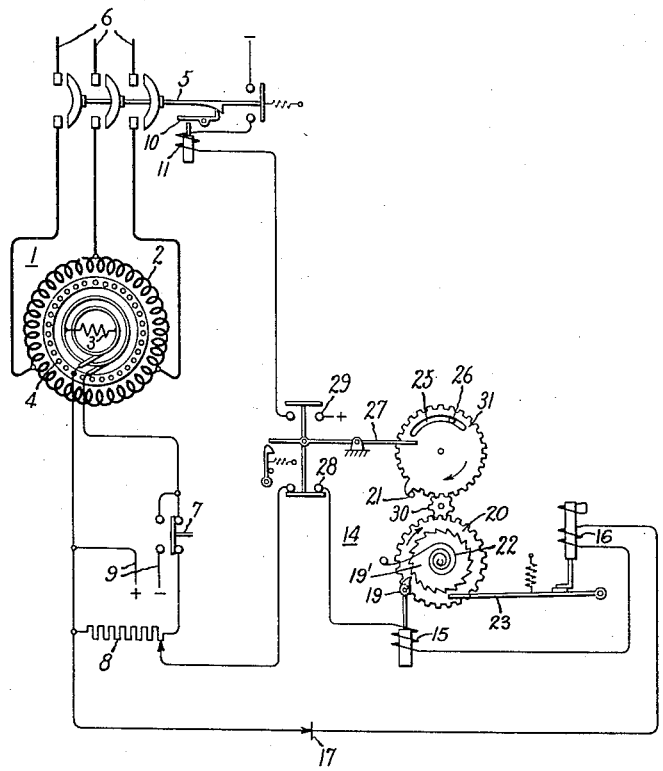
Inventor:
Samuel C. Ewing,
by Harry E. Dunham
His Attorney.

Patented June 10, 1941

2,245,189

UNITED STATES PATENT OFFICE 2,245,189

CONTROL SYSTEM FOR ALTERNATING CURRENT MOTORS

Samuel C. Ewing, Scotia, N. Y., assignor to General Electric Company, a corporation of New York Application July 18, 1939, Serial No. 285,101

12 Claims. (Cl. 172—274)

My invention relates to control systems for alternating current motors and particularly to systems for controlling the connections of such motors so as to protect them against predetermined abnormal conditions. My invention relates particularly to control systems for protecting a secondary winding of an alternating current motor, such, for example, as the squirrel cage winding of a synchronous motor, from becoming overheated by the currents induced therein when the motor is operating subsynchronously, and one object of my invention is to provide an improved arrangement for accomplishing this result.

My invention will be better understood from the following description when taken in connection with the accompanying drawing which diagrammatically illustrates a synchronous motor control system embodying my invention, and its scope will be pointed out in the appended claims.

Referring to the drawing, 1 represents a synchronous motor having an armature winding 2, a field winding 3, and a squirrel cage winding 4. In order to simplify the disclosure, I have shown my invention in connection with a full voltage manually controlled starting arrangement comprising a manually closed switch 5 for connecting the armature winding 2 to an alternating current supply circuit 6 and a manually operated 2-position field switch 7 which in one position connects a discharge resistor 8 across the terminals of the field winding 3, and in its other position connects a suitable source of excitation 9 across the terminals of the field winding 3. The switch 5 is shown as a latch closed switch which is held in its closed position by a latch 10. A release magnet 11 is provided which, when energized, releases the latch 10. While I have shown manually controlled switches 5 and 7, it will be obvious to those skilled in the art that any suitable well-known automatic means may be provided for controlling the operation of these two switches.

For protecting the squirrel cage winding 3 against overheating when for any reason the subsynchronous operation of the motor 1 is unduly prolonged I provide, in accordance with my invention, an arrangement for effecting the opening of the switch 5 in response to a predetermined number of cycles of current induced in the field winding 3 while the motor 1 is operating subsynchronously. It is well known that when a synchronous motor is operating subsynchronously, the armature winding thereof acts as a primary winding of a transformer to induce in the windings on the field structure, which act as secondary windings of a transformer, voltages of slip frequency, and these voltages in turn cause currents of slip frequency to flow through and heat up the secondary windings if they are connected in closed circuits. At high subsynchronous speeds the air circulation through the motor may be sufficient to dissipate the heat produced by these currents but as the subsynchronous speed decreases the circulation of air through the motor decreases so that the cooling effect produced thereby is correspondingly decreased. Therefore, it is apparent that the length of time that the induced currents can flow in the secondary windings of the motor without excessive heating decreases with the speed of the motor.

In the embodiment of my invention shown in the drawing, I provide a counting device 14 having an actuating magnet 15 and a release magnet 16 which are connected in series with a half-wave rectifier 17 across a portion of the discharge resistor 8. Each time the actuating magnet 15 is energized it moves a pawl 19 into engagement with a ratchet 19' rigidly secured to a gear 20 so as to rotate it in a clockwise direction the distance of one tooth. The release magnet 16, when energized, releases a holding pawl 23, which, when released, engages the ratchet 19' so as to prevent counterclockwise and allow clockwise movement of the gear 20. The gear 20 drives by means of suitable reduction gearing 30 a second gear 31 which is normally held against a stop 21 by a spring 22 which tends to rotate the ratchet 19' and gear 20 in a counterclockwise direction. Mounted in a slot 25 in the gear 31 is an adjustable pin 26 which is arranged to engage a contact lever 27 so as to open the contacts 28 and close the contacts 29 after the actuating magnet 15 has been energized a predetermined number of times depending upon the position of the pin 26 in the slot 25. The contact lever 27 is preferably arranged in any suitable manner so that it remains in its actuated position until reset by hand.

The release magnet 16 is of the well-known slow release type so that, as long as it is energized by the alternate half cycles of slip frequency current that flow through the rectifier 17, the holding pawl 23 is released so that it prevents counterclockwise movement of the gear 20. The magnet 15, however, is a quick-acting magnet which actuates the pawl 19 during each half cycle of slip frequency current which flows through the rectifier 17 and releases the pawl 19 during each half cycle of slip frequency current which is blocked by the rectifier 17. Therefore, with the arrangement shown the ratchet 19' and gear 20 are rotated in a clockwise direction the distance of one tooth of the ratchet 19' in response to each cycle of induced field current. The contacts 29 control an energizing circuit for the trip coil 11 of the switch 5 so that, after the counting device 14 has been actuated in response to a predetermined number of cycles of slip frequency current, the trip coil 11 is energized to open the switch 5 and disconnect the motor 1 from the supply circuit 6.

The operation of the embodiment of my invention shown in the drawing during the starting operation of the motor is as follows: When it is desired to start the motor 1, the switch 5 is manually closed to connect the armature winding 2 directly across the supply circuit 6 so that the motor 1 starts and accelerates as an induction motor. As soon as the armature winding 2 is energized, currents of slip frequency are induced in the field winding 3 and the squirrel cage winding 4. A portion of each cycle of induced current in the field winding 3 flows through the rectifier 17 and the windings of the magnets 15 and 16 so that the holding pawl 23 is released as long as current impulses of slip frequency flow through the rectifier 17 and the operating pawl 19 is actuated to advance the gear 20 the distance of one tooth in response to each cycle of current induced in the field winding 3. Normally the motor will accelerate to substantially synchronous speed in such a short time that the field switch 7 is closed to supply excitation to the field winding 3 and thereby cause the motor to pull into synchronism before a sufficient number of cycles of current has been induced in the field winding 3 to cause the counting device 14 to operate the contact lever 27. When the field switch 7 is operated to apply excitation to the field winding 3 the circuit of the magnets 15 and 16 is opened so that after a predetermined time interval magnet 16 releases the pawl 23 and the counting device 14 is restored to its normal position.

If for some reason the motor fails to reach the proper synchronizing condition before a predetermined number of cycles of current has been induced in the field winding 3, the counting device 14 actuates the contact lever 27 so that the contacts 28 in the energizing circuits of the magnets 15 and 16 are opened and the contacts 29 in the energizing circuit of the release magnet 11 are closed. Release magnet 11 then effects the opening of the switch 5 so as to disconnect the motor 1 from the supply circuit 6 thereby preventing the squirrel cage winding 4 from becoming overheated by the currents induced therein. It will be observed that by adjusting the position of the pin 26 in the slot 25 the number of cycles of induced field current required to effect the opening of the switch 5 can be preselected.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, an alternating current machine having a primary winding connected to an alternating current circuit and having a secondary winding, a counting device, means for actuating said device in response to each cycle of induced current in said secondary winding, and means responsive to a predetermined number of actuations of said counting device for effecting a predetermined change in the connections of said machine.

2. In combination, an alternating current machine having a primary winding connected to an alternating current circuit and having a secondary winding, a counting device, means for actuating said device in response to each cycle of induced current in said secondary winding, and means responsive to a predetermined number of actuations of said counting device for disconnecting said primary winding from the alternating current circuit.

3. In combination, a synchronous machine having an armature winding connected to an alternating current circuit and having a field winding, a counting device, means for actuating said device in response to each cycle of current induced in said field winding when said machine is operating subsynchronously, and means responsive to a predetermined number of actuations of said counting device for disconnecting said armature winding from the alternating current circuit.

4. In combination, an alternating current machine having a primary winding connected to an alternating current circuit and having a secondary winding, a notching device having an actuating winding connected to said secondary winding and responsive to each cycle of induced current in said secondary winding, and means responsive to a predetermined number of actuations of said device for disconnecting said primary winding from the alternating current circuit.

5. In combination, an alternating current machine having a primary winding connected to an alternating current circuit and having a secondary winding, a notching device responsive to each cycle of induced current in said secondary winding including an actuating winding connected to said secondary winding and a half-wave rectifier connected in series with said actuating winding and said secondary winding, and means responsive to a predetermined number of actuations of said device for disconnecting said primary winding from the alternating current circuit.

6. In combination, an alternating current machine having a primary winding connected to an alternating current circuit and having a secondary winding, a notching device having an actuating winding connected to said secondary winding and responsive to each cycle of induced current in said secondary winding, means for holding said device in its actuated positions, means responsive to a predetermined number of actuations of said device for disconnecting said primary winding from the alternating current circuit, and means controlled by the induced current in said secondary winding for releasing said holding means.

7. In combination, a synchronous machine having an armature winding connected to an alternating current circuit and having a field winding, a notching device having an actuating winding connected to said field winding and responsive to each cycle of induced current in said field winding, and means responsive to a predetermined number of actuations of said device for disconnecting the armature winding from the alternating current circuit.

8. In combination, a synchronous machine having an armature winding connected to an alternating current circuit and having a field winding, a notching device responsive to each cycle of induced current in said field winding including an actuating winding connected to said field winding and a half-wave rectifier connected in series with said actuating winding and said field winding, and means responsive to a predetermined number of actuations of said device for disconnecting the armature winding from the alternating current circuit.

9. In combination, a synchronous machine having an armature winding connected to an alternating current circuit and having a field winding, a notching device having an actuating winding connected to said field winding and responsive to each cycle of induced current in said field winding, means for holding said device in its actuated positions, means responsive to a predetermined number of actuations of said device for disconnecting said armature winding from the alternating current circuit, and means controlled by the induced current in said field winding for releasing said holding means.

10. In combination, a synchronous machine having an armature winding connected to an alternating current circuit and having a field winding, a notching device having a movable member normally biased to a predetermined position, a quick-acting magnet connected to said field winding for moving said member against said bias in response to each cycle of induced current in said field winding, means responsive to a predetermined number of actuations of said member by said magnet for disconnecting said armature winding from the alternating current circuit, means for holding said member in its actuated positions against said bias, and a slow-acting magnet for releasing said holding means connected to said field winding.

11. In combination, a synchronous machine having an armature winding connected to an alternating current circuit and having a field winding, a notching device having a movable member normally biased to a predetermined position, a quick-acting magnet for moving said member against said bias in response to each cycle of induced current in said field winding, means responsive to a predetermined number of actuations of said member by said magnet for disconnecting said armature winding from the alternating current circuit, means for holding said member in its actuated positions against said bias, a slow-acting magnet for releasing said holding means, and a series circuit including said magnets and said field winding.

12. In combination, a synchronous machine having an armature winding connected to an alternating current circuit and having a field winding, a notching device having a movable member normally biased to a predetermined position, a quick-acting magnet for moving said member against said bias in response to each cycle of induced current in said field winding, means responsive to a predetermined number of actuations of said member by said magnet for disconnecting said armature winding from the alternating current circuit, means for holding said member in its actuated positions against said bias, a slow-acting magnet for releasing said holding means, a half-wave rectifier and a series circuit including said magnets and said rectifier and said field winding.

SAMUEL C. EWING.